United States Patent
Grove

[11] 3,885,852
[45] May 27, 1975

[54] QUICK COUPLE ELECTRIC OUTLET

[76] Inventor: Edward H. Grove, P.O. Box 8, Morro Bay, Calif. 93442

[22] Filed: Oct. 24, 1973

[21] Appl. No.: 409,260

[52] U.S. Cl............ 339/95 D; 339/122 R; 339/128; 174/51; 174/53; 174/55
[51] Int. Cl.............................................. H01r 9/06
[58] Field of Search ............ 339/95, 119, 122, 123, 339/126, 127, 128, 129, 130, 138, 139, 140; 174/51 X, 53 X, 55 X, 59

[56] References Cited
UNITED STATES PATENTS

| 992,971 | 5/1911 | McDonald | 339/128 |
| 1,300,286 | 4/1919 | McKay | 339/122 |
| 2,743,423 | 4/1956 | Parks | 174/51 |
| 2,876,394 | 3/1959 | Gerrish | 174/53 |
| 2,934,590 | 4/1960 | Thompson et al. | 174/53 |
| 3,744,004 | 7/1973 | Kinsey | 339/122 R |

*Primary Examiner*—Marion Parsons, Jr.
*Assistant Examiner*—Robert A. Hafer

[57] ABSTRACT

Disclosed is a wall mounted electrical outlet assembly in which both the plug receptacle mounts in the outlet box by means of spring fingers which engage lands on the sides of the receptacle, and is released by rotation of the receptacle with respect to the box until the fingers move into channels between the lands. The face plate is formed integral with the plug receptacle and wires are attached to the back of the receptacle by releasable clamps. No screws are used in the entire assembly and a double plug receptacle may be disposed with the plug openings horizontal or vertical without requiring a different positioning of the outlet box. An adaption of the outlet assembly for electric switches and telephone cords is also shown.

10 Claims, 13 Drawing Figures

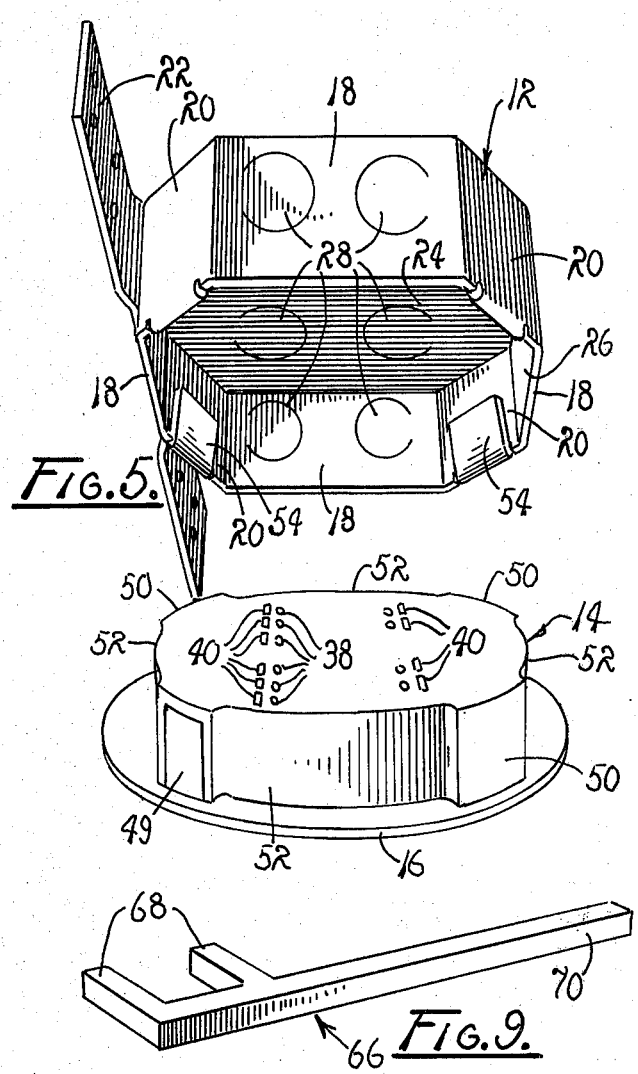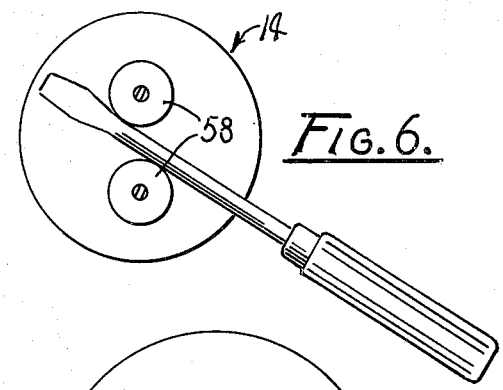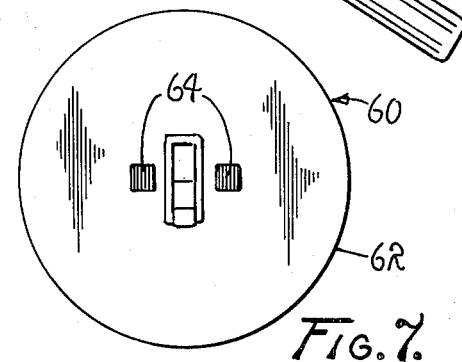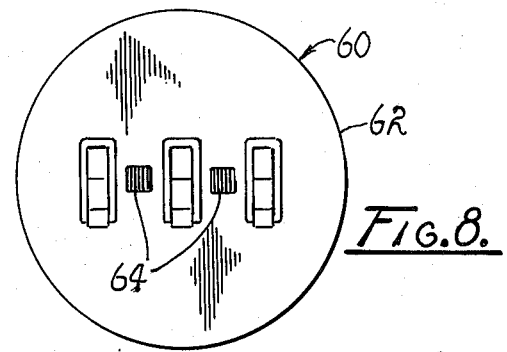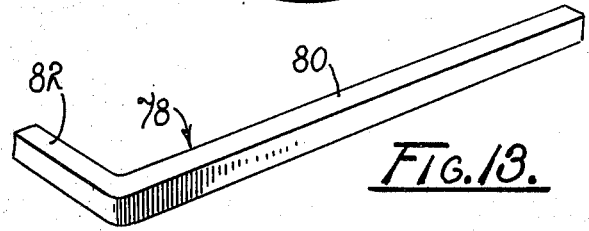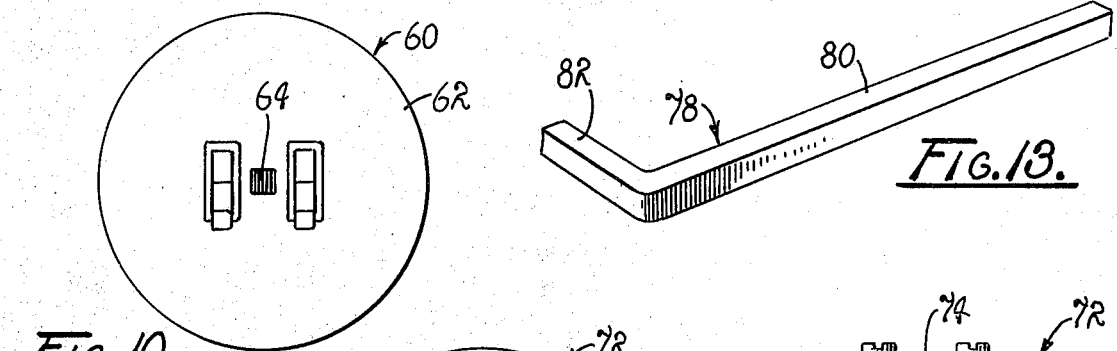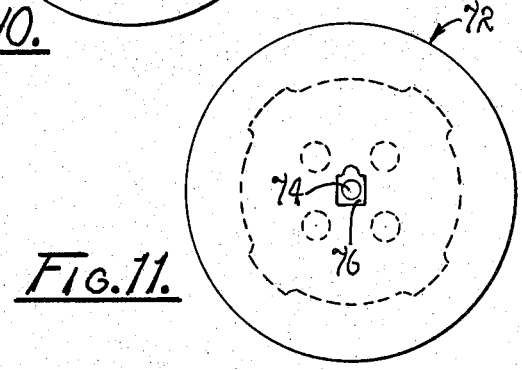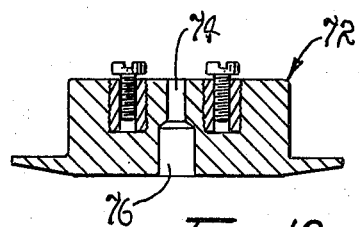

3,885,852

QUICK COUPLE ELECTRIC OUTLET

BACKGROUND OF INVENTION

This invention relates generally to electrical outlets for building wiring and more particularly to outlet assemblies in which a plug receptacle or switch unit can be assembled with the outlet box without the use of screws.

Because of the constantly increasing cost of labor and the general desire for greater time savings in installation and repair, efforts have been made to devise an electrical outlet assembly for building wiring which is more convenient to use than the conventional outlet. By conventional outlet I am referring to the widely used outlet with a rectangular outlet box into which a rectangular plug receptacle is mounted by screws and covered by a face plate screwed to the receptacle. These conventional units not only have the disadvantage of being slow to assemble and disassemble but they are not as adaptable to varying circumstances as desirable. In installing a simple two plug receptacle, for example, if the two plug openings are to be positioned in horizontal relationship, the outlet box must be differently mounted on the wall stud than for an installation where the plug openings are to be vertical. The same is true for the mounting of wall switches.

Efforts to date to improve upon the conventional electrical outlet have been directed primarily to a more convenient means for coupling the plug receptacle to the outlet box and have not met with great success in the market place because they were too expensive to justify their increased convenience. Furthermore, none of the prior attempts to improve upon the conventional outlet avoided the other inherent problems of horizontal or vertical positioning of the box, screw attachment of the wires, and screw assembly of the face plate. The conventional outlet is therefore still in wide use and the need for a truly acceptable improvement still exists.

It is, therefore, a major object of my invention to provide an improved electrical outlet assembly that may be readily assembled and disassembled without the use of screws.

It is also an important object of my invention to provide an improved electrical outlet assembly in which multiple plug openings or switch units may be either horizontally or vertically mounted regardless of the position in which the outlet box is mounted to the building stud.

Another object of my invention is to provide an improved electrical outlet assembly of the type described in which the wires are attached to the plug receptacle or switch unit by incorporated, readily releasable wire clamps rather than screws.

Still another object of my invention is to provide an improved electrical outlet assembly of the type described in which the plug receptacle or switch unit is of unitary construction and can be formed from plastic with the wire clamps and face plate incorporated.

Still a further object of my invention is to provide an improved electrical outlet of the type described in which the outlet box and the plug receptacle or switch unit are both cylindrical and are disassembled by relative rotation for a part of a revolution.

Yet another object of my invention is to provide electrical outlet of the type described which can be adapted to use as a telephone cord outlet with a minimum of changes.

These and other objects and advantages of my invention will become more readily apparent from the following detailed description of preferred embodiments thereof and the accompanying drawings in which:

FIG. 5 is a perspective view of my preferred embodiment showing the plug receptacle disassembled from the outlet box;

FIG. 6 is a front elevational view showing the rotation of the plug receptacle for disassembly from the outlet box;

FIG. 7 is a front elevational view showing a single switch unit in place of the double plug receptacle;

FIG. 8 is a front elevational view showing a triple switch unit in place of the plug receptacle;

FIG. 9 is a perspective view of a tool adapted to rotate a switch unit for removal from the outlet box;

FIG. 10 is a front elevational view showing a double switch unit;

FIG. 11 is a rear elevational view of a modified form of my invention adapted for use as a telephone cord outlet;

FIG. 12 is a sectional plan view of the modified form of my invention shown in FIG. 11; and FIG. 13 is a perspective view of a tool adapted to remove the receptacle of my modified form from the outlet box.

DETAILED DESCRIPTION OF PARTS

Figure 1:
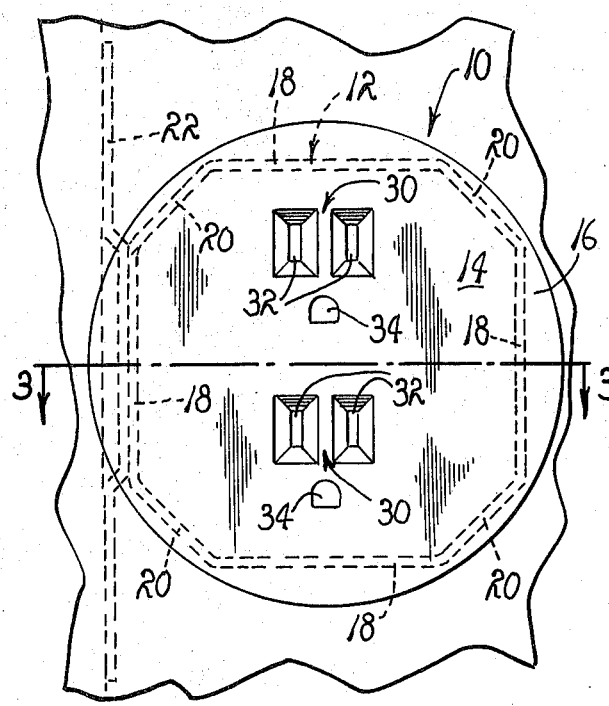
FIG. 1 is a front elevational view of a preferred embodiment of my invention showing a plug receptacle unit.
Figure 2:
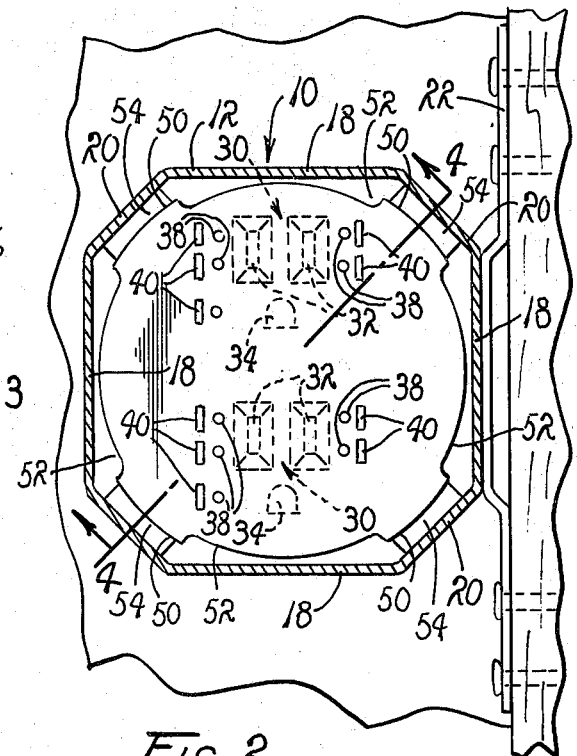
FIG. 2 is a rear elevational section view of my preferred embodiment showing the back of the plug receptacle.
Figure 3:
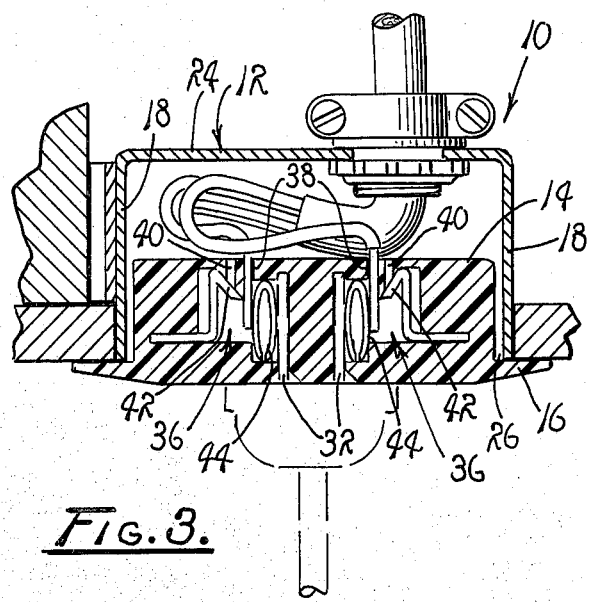
FIG. 3 is a sectional view taken on 3—3 in FIG. 1.

Referring now to the drawings, and particularly FIGS. 1 through 5 thereof, the numeral 10 refers generally to my improved electrical outlet for building wiring. The improved outlet 10 has an outlet box 12 with a plug receptacle 14 and a face plate 16. The outlet box 12 is generally octagonal and symetrical with four long sides 18 and four short sides 20, pairs of which are oppositely disposed. A mounting bracket 22 is attached to one of the long sides 18. The outlet box has a rear wall 24 and a front opening 26. Knockout openings 28 are provided in the rear wall 24 and in the pair of long sides 18 disposed normal to the mounting bracket 22, through which wires can be passed into the outlet in a manner well known in the art.

The plug receptacle 14 is formed integral with the face plate 16 and has two plug openings 30. Each of the plug openings 30 consist of two power prong slots 32 and a ground prong slot 34. The power prong slots 32 are elongated and the ground prong slot 34 is semicylindrical as is well known in the art (see FIG. 1). As best seen in FIGS. 2 through 5, the rear portion of the plug receptacle 14 has a plurality of wire clamps 36, formed integral therewith. The wire clamps 36 each consist of a wire receptacle 38 and an associated trip slot 40. Wire engaging fingers 42 are mounted inside the plug receptacle 14 adjacent each of the power prong slots 32 and the ground prong slots 34, as are resilient interconnectors 44. The wire engaging fingers 42 are resiliently biased to engage and hold a wire end in the wire receptacle 38, when it is projected therein, and the resilient interconnectors 44 provide interconnection between the wire and a prong inserted into one of the prong slots. The trip slots 40 are so disposed with respect to their associated wire receptacle that inserting a screw driver end therein deflects the wire engaging finger 42 and permits withdrawal of the wire end from the wire receptacle. Such quick attaching wire coupling are known in the art, but have not been incorporated into a quick coupling outlet as herein described.

In order to provide for easy assembly and disassembly of the plug receptacle and the outlet box, the plug receptacle has alternate lands 50 and channels 52 formed on the rear portion thereof. Resilient lock fingers 54 are provided on each of the short legs 20 of the outlet box 12 which project rearwardly and inwardly from the periphery of the outlet box. For assembly of the plug receptacle with the outlet box, the receptacle is inserted into the box with the lands 50 aligned with the fingers 54. The lands 50 are engaged by the inner ends of the lock fingers 54 to hold the plug receptacle securely in the outlet box when it is fully inserted into the box. If the plug receptacle is rotated one-eighth of a turn, however, the lock fingers move off of the lands 50 and into the channels 52. In this position the lock fingers 54 no longer hold the plug receptacle in the outlet box and the plug receptacle may be readily withdrawn (see FIG. 5).

Figure 4:
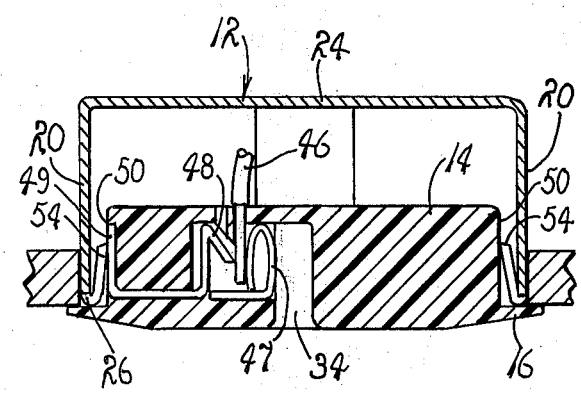
FIG. 4 is a sectional view taken on 4—4 in FIG. 2.

As best shown in FIG. 4, the ground prong slots 34 have wire engaging fingers 48 which with conductor ends 49 extend to the peripheral surface of one of the lands 50. When the lock fingers 54 engage a land upon which the connect end 49 is disposed, the wire engaging finger 48 is grounded to the outlet box.

The face plate 16, which is formed integral with the plug receptacle 14 extends beyond the periphery of the plug receptacle to engage the periphery of the outlet box, thereby covering the front opening 26 of the box. Thus, when the plug receptacle is locked in the outlet box my electrical outlet is an engaged unit, safe against outside access.

As best shown in FIG. 6, rotation of the plug receptacle 14 to free it from the outlet box 12 by moving the lock fingers 54 from the lands 50 to the channels 52 can be readily accomplished by a screw driver if appliance plugs 58 are inserted in each of the plug openings. The screw driver shaft need only be inserted between the plugs and the handle rotated to rotate the plug receptacle.

In FIGS. 7 through 10, I show a modified form of my invention in which the plug receptacle 14 is replaced with a switch unit 60. The switch unit 60 has one, two or even three switches formed together into an assembly with the same outside dimensions as the plug receptacle 14. The rear portion of the switch units 60 has wire end receptacles 38 and associated trip slots 40 for quick coupling wires to the unit, and lands 50 separated by channels 52 for quick coupling the unit to the outlet box, the same as in the plug receptacle. The switch unit 60 also has a face plate 62 formed integral therewith in the same manner as described for the plug receptacle.

It will, therefore, be understood that the switch units 60 are identical to the plug receptacle 14 except that the plug sockets are replaced with one or more electrical switches.

To provide means for rotating the switch units 60 to free the lands 50 from the lock fingers 54 and permit removal of the unit from the outlet box, I provide one or two grip sockets 64 in the face plate of the unit. The grip sockets 64 are square and have the width of an average screw driver blade. Where two grip sockets are provided as in the case of my one switch or three switch units, inserting the blades of two screw drivers simultaneously into the sockets provides sufficient grip for rotating the unit, and where only one grip socket 64 is provided, as in the case of my two switch unit, inserting one screw driver blade of sufficient width to wedge itself diagonally in the grip socket will provide the rotating vehicle. However, though my switch units 60 can be freed with the use of screw drivers, in FIG. 9 I show a special gripping tool 66 which may also be used. The gripping tool 66 has a square cross-section adapted to fit snuggly into the grip sockets 64. The gripping tool 66 has a pair of fingers 68 which project normal to a shank 70 at one end. For a switch unit with only one grip socket, the end of the gripping tool shank 70 is inserted into the socket and the unit rotated by applying torque to the fingers 68.

In FIGS. 11 and 12, I show still another form of my quick coupling outlet. In this form a telephone unit 72 is inserted into the outlet box. Again, the rear portion of the telephone unit has lands 50 and channels 52 which cooperate with the lock fingers 54 to releasably hold the unit in the outlet box 12, just like the plug receptacle and the switch unit. The telephone unit has a cord passage 74 through its center, however, and four screw terminals on its rear portion for joining in wall telephone wires to the leads from a telephone in the manner well known in the art. Screw terminals are used on the telephone unit because wire end receptacle and trip slot couplings of the type used in my plug receptacle and switch unit are not effective for telephone wires.

To rotate my telephone unit 72 for removal from the outlet box 12, I provide a square countersunk opening 76 in the face side of the cord passage 74 (see FIG. 12). A removal tool 78 is then provided, as shown in FIG. 13, which has a shank 80 and a finger 82. The opening 76 has a wire channel so that when the finger 82 is inserted into the opening 76 the cord passes along the channel and the tool can rotate the telephone unit without interfering with the cord.

OPERATION

Having described the various parts and forms of my invention, I will now describe its operation.

The outlet box 12 is universal in that it will interchangeably receive the plug receptacle 14, the switch unit 60, or the telephone unit 72. The outlet box 12 is installed by nailing it to a stud in the building wall during construction. It is installed in the same position regardless of which type of core unit (i.e., plug receptacle, switch unit or telephone unit) is to be installed, because the core unit can be rotated in the outlet box as desired.

The desired building wiring is then fed into the outlet box 12 through knock out openings 28 in the rear wall 24 of the box and secured in the usual manner.

When construction has proceeded to the place where installation of the core units (i.e., plug receptacles, switch units or telephone units) is appropriate, they are placed in the outlet boxes as called for by the specifications. Where a double plug receptacle 14 is called for, the ends of the building wires are inserted in the proper sequence into the power prong slots 32 and ground prong slots 34 in the rear of the plug receptacle. The wire engaging fingers 42 and 48 of the prong slots 32 and ground prong slots 34 clamp the wire ends in the plug receptacle.

The plug receptacle is then inserted into the outlet box with the lands 50 aligned with resilient lock fingers 54 on the inner periphery of the box. When the plug receptacle has been fully inserted into the outlet box the lock fingers 54 snap inward to engage the lands 50 and hold the plug receptacle in place with the inner surface of the face plate 16 snug against the inside wall of the building.

The two plugs of the plug receptacle may be aligned vertically or horizontally, as desired, at the time the plug receptacle 14 is connected to the building wires and inserted into the outlet box 12. This is possible because the plug receptacle may be rotated with respect to the outlet box as previously explained.

If the switch unit 60 is to be placed in the outlet box 12 instead of a plug receptacle, it is connected to the building wires and inserted into the box in the same manner.

Where the outlet box 12 is to be coupled with the telephone unit 72, the telephone wiring is run into the outlet box during construction rather than electrical wiring. When installation of the telephone unit 72 is appropriate, the telephone wires are connected to the screw terminals on the rear of the unit and the unit is inserted into the outlet box in the same manner as the plug receptacle.

When removal of the plug receptacle is desired, it need only be rotated for part of a turn to move the lock fingers 54 into the cnannels 52. Then the plug receptacle is free to be drawn out of the box for reconnection, repair or replacement. Rotation can be accomplished by placing electrical plugs in the plug sockets and engaging a screw driver between them in the manner shown in FIG. 6.

The switch unit 60 and telephone unit 72 are removable by rotation in the same manner as the plug receptacle, however, use of the special tools shown in FIGS. 9 and 13 may be required for this purpose.

From this detailed description of the parts and operation of my improved electrical outlet assembly it will be understood that I have provided a very versatile, economic device with substantial labor saving potential. It can be readily manufactured from plastic and metal materials and is much easier to install and replace.

I claim:

1. An electrical wall unit assembly comprising:
   a housing having a generally symetrical periphery and mounting means disposed for mounting said housing in the wall of a building;
   a core unit having a periphery mated to the periphery of said housing for insertion and rotation therein, said core unit periphery having a plurality alternately disposed of lands and channels;
   a plurality of engaging fingers interconnected with said housing and disposed to engage said lands on said core unit when said core unit is inserted into said housing with said fingers aligned with said lands, and to disengage from said lands when said core unit is rotated with respect to said housing to align said fingers with said channels; and
   a face plate on said core unit disposed to form a flange extending radially outward from said core unit to close said housing when said core unit is inserted into said housing.

2. An electrical wall unit assembly as described in claim 1, in which:
   said core unit includes an electrical plug receptacle with plug prong openings in the face of said core unit and building wiring connectors in the back of said plug unit, said building wiring connectors being of a quick coupling type wherein the wire ends are inserted into a bore and engaged by a resilient lock finger to secure said wire ends in said bore and are released from said bore by inserting a screwdriver in a slot to release said lock finger; and
   ground means interconnected between a ground wire receptacle on the back of said core unit and said housing.

3. An electrical wall unit assembly as described in claim 1, in which:
   said core unit includes electrical switch means and has wire connection means on the back thereof.

4. An electrical wall unit assembly as described in claim 1, in which:
   said core unit includes electrical plug receptacle means and has wire connection means on the back thereof.

5. An electrical wall unit assembly as described in claim 1, in which:
   said core unit includes a plurality of axially aligned electrical plug receptacles.

6. An electrical wall unit assembly as described in claim 1, in which:
   said core unit includes a plurality of axially aligned electrical switches.

7. An electrical wall unit assembly as described in claim 1, in which:
   said core unit includes a telephone cord outlet.

8. An electrical wall unit assembly as described in claim 1, in which:
   said core unit includes wiring connectors in the rear portion thereof disposed to receive wire ends of building wiring, and quick coupling means operable to readily engage and release said wire ends.

9. An electrical outlet comprising:
   an outlet box;
   a core unit adapted to fit into said outlet box, said core unit having an electrical wall device therein;
   said outlet box and said core unit having correlated generally symetrical peripheries wherein said core unit may be inserted into said outlet box in a plurality of rotatably related positions and said core unit may be rotated with respect to said outlet box after insertion therein:
   mechanical connection means interconnecting said outlet box and said core unit, said mechanical connection means including a plurality of engaging fingers, a plurality of engageable lands disposed for engagement by said fingers, and release means operable to release said engagement between said fingers and said lands, said release means including a channel adjacent each of said lands disposed to release said engaging fingers from said lands upon rotation of said core unit with respect to said outlet box to permit withdrawal of said core unit from said outlet box; and electrical connection means disposed to interconnect electrical wiring with said electrical wall device in said core unit.

10. An electrical outlet as described in claim 9, in which:

said outlet box has a generally cylindrical periphery;

said core unit has s generally cylindrical periphery adapted to fit into said outlet box; and said engaging fingers of said mechanical connection means are resiliently disposed with respect to said lands whereby said fingers pass over the surfaces of said lands upon insertion of said core unit into said outlet box but engage said surfaces of said lands when said lands are moved in a direction for withdrawal of core unit from said outlet box, and said release means of said mechanical connection means includes said plurality of channels adjacent said lands being alignable with said engaging fingers by rotation of said core unit in said outlet box to disengage said fingers from said surfaces of said lands, and when said fingers are so aligned with said channels said core unit is withdrawable from said outlet box.

* * * * *